US012307584B2

(12) United States Patent
Kumar et al.

(10) Patent No.: US 12,307,584 B2
(45) Date of Patent: May 20, 2025

(54) SYSTEMS FOR EFFICIENTLY GENERATING BLEND OBJECTS

(71) Applicant: Adobe Inc., San Jose, CA (US)

(72) Inventors: Harish Kumar, Noida (IN); Apurva Kumar, Nehru Nagar (IN)

(73) Assignee: Adobe Inc., San Jose, CA (US)

( * ) Notice: Subject to any disclaimer, the term of this patent is extended or adjusted under 35 U.S.C. 154(b) by 302 days.

(21) Appl. No.: 17/873,848

(22) Filed: Jul. 26, 2022

(65) Prior Publication Data

US 2024/0037845 A1 Feb. 1, 2024

(51) Int. Cl.
*G06T 15/50* (2011.01)
*G06T 15/00* (2011.01)
*G06T 17/00* (2006.01)

(52) U.S. Cl.
CPC .......... *G06T 15/503* (2013.01); *G06T 15/005* (2013.01); *G06T 17/005* (2013.01)

(58) Field of Classification Search
None
See application file for complete search history.

(56) References Cited

U.S. PATENT DOCUMENTS

| | | | | |
|---|---|---|---|---|
| 7,616,200 B1* | 11/2009 | Heinrich | ............... | G06T 11/001 |
| | | | | 345/530 |
| 7,986,325 B1* | 7/2011 | Gold | ....................... | G06T 15/04 |
| | | | | 345/506 |
| 10,395,259 B1* | 8/2019 | Abdulla | .................. | G06F 16/20 |
| 2005/0116963 A1* | 6/2005 | Bourdev | ................. | G06T 11/40 |
| | | | | 345/619 |
| 2005/0180647 A1* | 8/2005 | Curry | ........................ | G06T 7/90 |
| | | | | 382/302 |
| 2006/0059181 A1* | 3/2006 | Hutchins | ............... | G06F 16/245 |
| 2010/0315431 A1* | 12/2010 | Smith | ..................... | G06T 11/20 |
| | | | | 345/619 |
| 2011/0109642 A1* | 5/2011 | Chang | .................... | G06T 11/60 |
| | | | | 345/589 |
| 2014/0035939 A1* | 2/2014 | Schneider | ............. | G09G 5/363 |
| | | | | 345/545 |
| 2014/0267276 A1* | 9/2014 | Hakura | ................. | G06T 15/005 |
| | | | | 345/506 |
| 2017/0188002 A1* | 6/2017 | Chan | ..................... | H04N 13/122 |
| 2018/0101928 A1* | 4/2018 | Bogusz | .................. | G09G 5/377 |
| 2020/0125668 A1* | 4/2020 | Psaroudakis | ........ | G06F 9/45558 |
| 2021/0279954 A1* | 9/2021 | Yang | ...................... | G06T 11/40 |
| 2022/0084226 A1* | 3/2022 | Uludag | ................... | G06T 11/40 |

* cited by examiner

*Primary Examiner* — Anh-Tuan V Nguyen
(74) *Attorney, Agent, or Firm* — FIG. 1 Patents

(57) ABSTRACT

In implementations of systems for efficiently generating blend objects, a computing device implements a blending system to assign unique shape identifiers to objects included in an input render tree. The blending system generates a shape mask based on the unique shape identifiers. A color of a pixel of a blend object is computed based on particular objects of the objects that contribute to the blend object using the shape mask. The blending system generates the blend object for display in a user interface based on the color of the pixel.

20 Claims, 13 Drawing Sheets

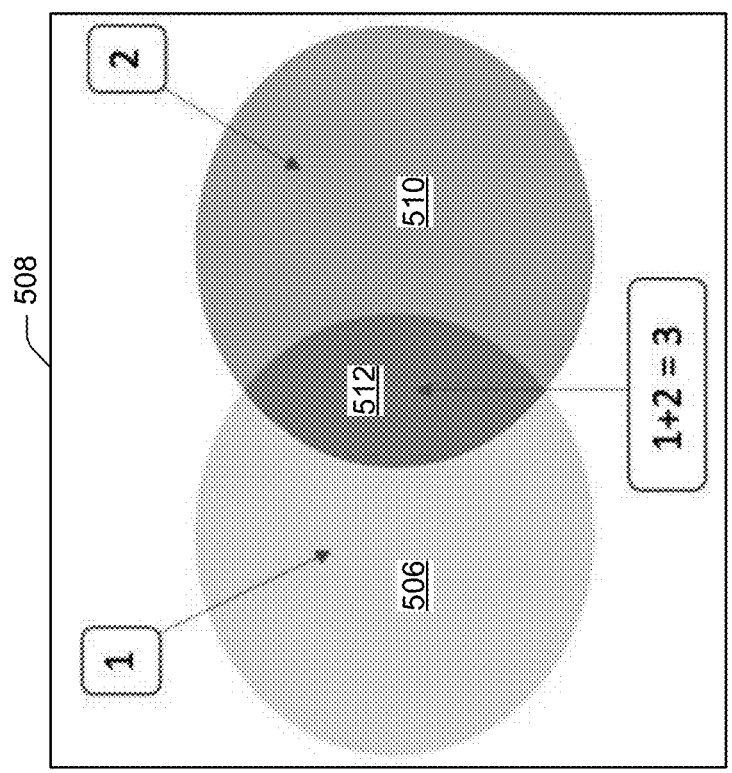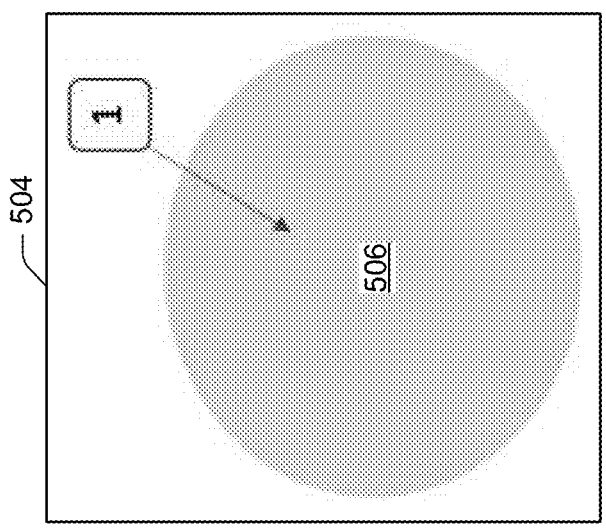
Fig. 5A

800

802
Assign unique shape identifiers to objects included in an input render tree

804
Generate a shape mask based on the unique identifiers

806
Compute a color of a pixel of a blend object based on particular objects of the objects that contribute to the blend object using the shape mask

808
Generate the blend object for display in a user interface based on the color of the pixel

*Fig. 8*

SYSTEMS FOR EFFICIENTLY GENERATING BLEND OBJECTS

BACKGROUND

Colors of blend objects are composited from colors of other objects that are below the blend objects in a render tree. For example, a color of a blend object in the render tree depends on colors of objects below the blend object in a z-order of the render tree. As a result of this dependency, outputs of rendering commands for objects that contribute to the blend object need to be complete in order to render the blend object. One technique for reading colors of previous draw calls leverages synchronization primitives such as a texture barrier. However, synchronization primitives are not available for web-based applications.

In applications without these primitives, rendering of the blend object is delayed until previous draw calls for the objects that contribute to the blend object are complete. Once complete, outputs of the previous draw calls are copied from a frame buffer to an additional texture which is passed as an input to a drawing shader in order to render the blend object. Rendering the blend object in this manner is slow and inefficient because it introduces one delay by making a central processing unit (CPU) wait for a graphics processing unit (GPU) to complete an operation, and introduces another delay by making the GPU wait for the CPU to issue new draw calls which is a shortcoming of conventional systems for rendering blend objects.

SUMMARY

Techniques and systems for efficiently generating blend objects are described. In an example, a computing device implements a blending system to assign unique shape identifiers to objects included in an input render tree. For instance, the unique shape identifiers have values that increase with a z-order of the objects in the input render tree.

The blending system generates a shape mask based on the unique shape identifiers. The shape mask includes unique shape identifiers of particular objects of the objects that contribute to a color of a pixel of a blend object. For example, the color of the pixel is computed using the shape mask. The blending system generates the blend object for display in a user interface based on the color of the pixel.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 5A and 5B illustrate a representation of generating shape masks based on unique shape identifiers of objects included in an input render tree.

FIG. 8 is a flow diagram depicting a procedure in an example implementation in which a color of a pixel of a blend object is computed and the blend object is generated for display in a user interface based on the color of the pixel.

DETAILED DESCRIPTION

Overview

Figure 1:
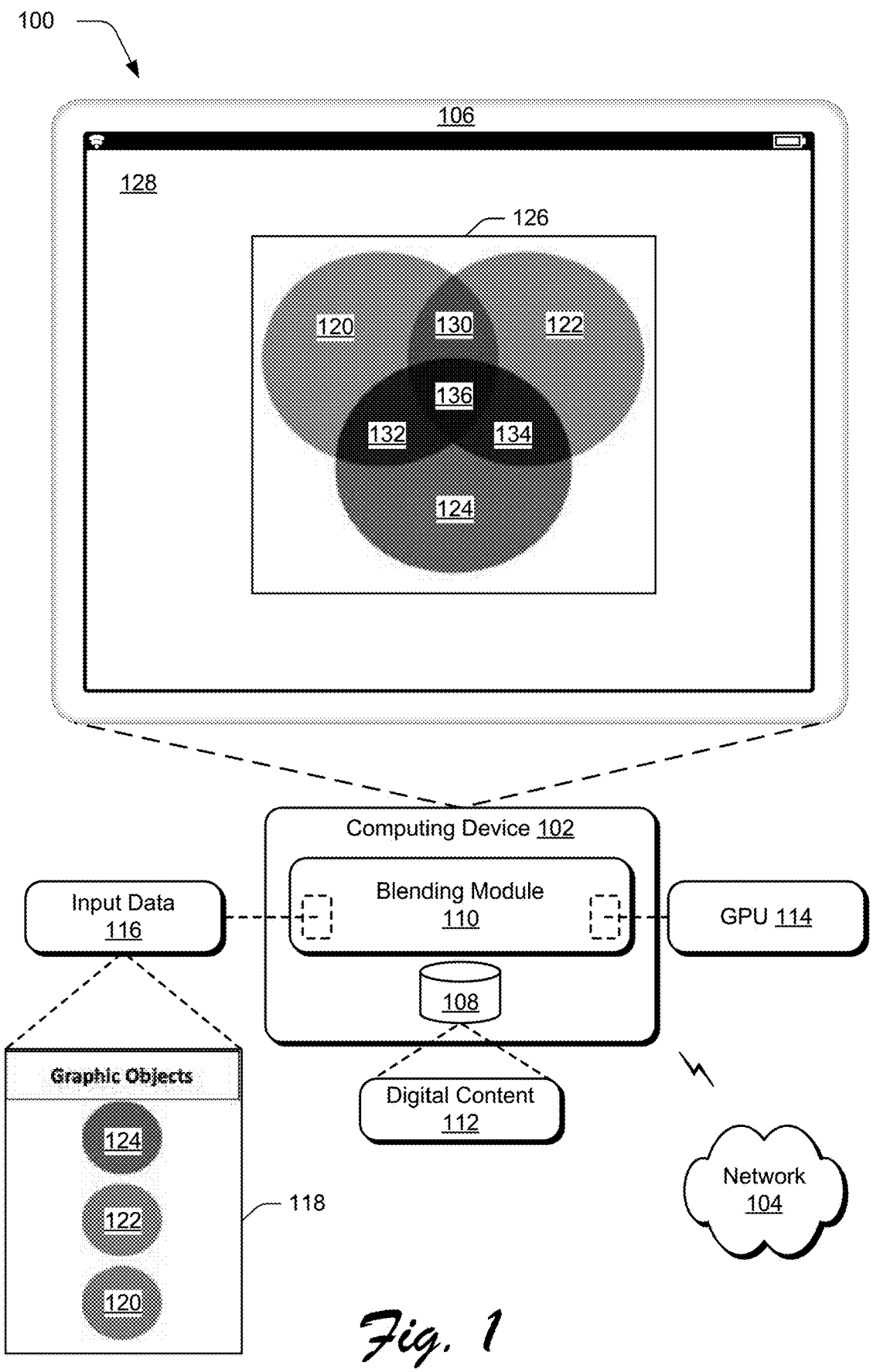
FIG. 1 is an illustration of an environment in an example implementation that is operable to employ digital systems and techniques for efficiently generating blend objects as described herein.

Applications in which synchronization primitives are not available such as web-based platforms are not capable of efficiently rendering blend objects. For these applications, rendering of a blend object is delayed until previous draw calls for objects that contribute to the blend object are complete. Once complete, outputs of the previous draw calls are copied from a frame buffer to an additional texture which is passed as an input to a drawing shader in order to render the blend object. Rendering the blend object in this manner is inefficient because it introduces a delay by making a CPU wait for a GPU to complete an operation, and then introduces another delay by making the GPU wait for the CPU to issue new draw calls which is a limitation of conventional systems for rendering blend objects.

In order to overcome the limitations of conventional systems, techniques and systems are described for efficiently generating blend objects. In one example, a computing device implements a blending system to assign unique shape identifiers to objects included in a set of k objects in an input render tree. For example, the set of k objects includes all objects that are included in the input render tree or the set of k objects includes a subset of all the objects that are included in the input render tree.

The blending system assigns a unique shape identifier to each object in the set of k objects, and the unique shape identifiers have values that increase with a z-order of the objects in the input render tree. For example, the unique shape identifiers indicate a relative order of particular objects included in the input render tree in addition to uniquely identifying the particular objects. The blending system generates shape masks based on the unique shape identifiers assigned to the objects in the set of k objects.

To do so in one example, the blending system incorporates an integer texture as a color attachment to a frame buffer and issues render calls for each of the objects in the set of k objects on the frame buffer. Each of the objects is drawn in the z-order such that each object's unique shape identifier is written to the integer texture instead of writing color values to a floating point frame buffer. For example, the blending system configures a rendering pipeline to append write operations of an object to a current value in a shape texture.

A vertex shader of the rendering pipeline receives the unique shape identifiers in vertex buffer data, and the vertex shader partially renders pixels of the objects and computes coverage for the objects (in the set of k objects) for an anti-aliased appearance. A fragment shader of the rendering pipeline receives the unique shape identifiers and the corresponding computed coverage and discards fragments for which coverage at a pixel is zero. The fragment shader generates the shape masks for the objects based on the unique shape identifiers, and the blending system resets the color attachment to an original floating point texture to store color values. For instance, the fragment shader generates the shape masks by combining the unique shape identifiers of multiple objects in the set of k objects that contribute to a final color of a pixel such that a particular shape mask for a particular pixel incudes unique shape identifiers of each object in the set of k objects that contribute to a final color of the particular pixel.

In order to determine final output colors, the blending system computes a union bounding box of the objects in the set of k objects. This union bounding box is a set of all the pixels that could potentially be painted by an object included in the set of k objects. For example, the vertex shader receives bounding box coordinates of the union bounding box, and the vertex shader passes these coordinates to the fragment shader. The fragment shader iterates over bits in the shape masks that represent unique shape identifiers to determine objects that contribute to color computations of pixels. For instance, if a bit is set to 1 in a shape mask for a specific pixel, then a corresponding object having a unique shape identifier represented by the bit is included in the color computation for the specific pixel.

In an example, colors are computed by compositing colors of each ith object included in the set of k objects with a color computed until an (i−1)th object using a blend mode of the ith object. For any pixel, its color may depend on objects in the input render tree before the set of k objects; however, final output colors from those objects are already drawn in the render texture before this call. Thus, for any fragment, a color of a first contributing object is first composited with a color of a render texture using its blend mode. The final computed colors and appearance attributes defined by the objects in the input render tree are usable to efficiently generate blend objects for display in a user interface.

At the end of a render pass painting the union bounding box, the integer texture is cleared to zero to prepare for a next set of k objects. Because the described systems are capable of generating the shape masks for each set of k objects, the described systems and techniques are universally implementable on all platforms regardless of differences between hardware configurations of different GPU devices. The described systems are also capable of rendering multiple objects with blend modes in a single draw call. This is not possible in conventional systems for rendering blend objects due to the dependence on color outputs from previous objects. By leveraging the unique shape identifiers and the shape masks, the described systems are capable of rendering blend objects at display rates more than 30 percent higher than display rates when rendering the same blend objects using conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. In some examples, the display device 106 is an ultra-high-definition display device with a resolution of 4K, 5K, 8K, etc. A variety of device configurations are usable to implement the computing device 102 and/or the display device 106. The computing device 102 includes a storage device 108 and a blending module 110. The storage device 108 is illustrated to include digital content 112 such as digital images, graphic artwork, digital videos, etc.

The computing device 102 and/or the blending module 110 have access to a graphics processing unit (GPU) 114 which is representative of multiple GPUs 114 in some examples. In one example, the computing device 102 includes the GPU 114 in addition to a central processing unit (CPU). In another example, the GPU is available to the computing device 102 and/the blending module 110 via the network 104. For example, the computing device 102 and the blending module 110 leverage the GPU 114 (e.g., GPU 114 computing kernels) for processing and rendering the digital content 112 and/or for processing data in series or parallel with the CPU such as in a CPU-GPU 114 framework. In an example, this includes leveraging multiple CPUs and/or multiple GPUs 114.

The blending module 110 is illustrated as having, receiving, and/or transmitting input data 116 describing an input render tree 118. As shown, the input render tree 118 includes objects 120-124 to be rendered as part of a rendering pipeline. For instance, each of the objects 120-124 in the input render tree 118 has a defined geometry and appearance attributes such as a color, a transparency, a blend mode, etc. In some examples, the rendering pipeline is implemented via the network 104 such that graphics processing unit synchronization primitives are not available for rendering the objects 120-124. In other examples, the rendering pipeline is implemented locally by the computing device 102 and/or the GPU 114.

For example, the blending module 110 processes the input data 116 to assign unique shape identifiers to the objects 120-124 included in the input render tree 118. In this example, the objects 120-124 are organized in a z-order in the input render tree 118 that begins with object 120 and ends with object 124 and the blending module 110 assigns the unique shape identifiers to the objects 120-124 based on the z-order. Continuing the previous example, the blending module 110 assigns each of the objects 120-124 the unique shape identifiers such that values of the unique shape identifiers increase in the z-order.

For instance, this causes a value of a unique shape identifier for the object 120 to be lower than values of unique shape identifiers for the objects 122, 124. Similarly, a value of the unique shape identifier for the object 124 is higher than the values of the unique shape identifiers for the objects 120, 122. Accordingly, the unique shape identifiers assigned to the objects 120-124 are usable to uniquely identify each of the objects 120-124 and also to determine a relative order among the objects 120-124 in the input render tree 118.

In one example, the unique shape identifiers are binary numbers and the blending module 110 determines a number of bits for the binary numbers based on a number of the objects 120-124. In this example, the number of bits included in the unique shape identifiers is equal to the number of objects 120-124 included in the input render tree 118. Consider an example in which the blending module 110 determines that the unique shape identifiers include three bits based on the three objects 120-124. In this example, the blending module 110 assigns the object 120 a unique shape identifier of 0 0 1; the blending module 110 assigns the object 122 a unique shape identifier of 0 1 0; and the blending module 110 assigns the object 124 a unique shape identifier of 1 0 0.

For example, the blending module 110 is capable of assigning values of unique shape identifiers between the values of the unique shape identifiers assigned to the objects 120-124 to combinations of the objects 120-124. In addition to each of the objects 120-124, the blending module 110 also assigns a unique shape identifier to a combination of the objects 120, 122; a combination of the objects 120, 124; a combination of the objects 122, 124; and a combination of the objects 120, 122, 124. After assigning the unique shape identifiers to the objects 120-124 and the combinations of the objects 120-124, the blending module 110 writes the unique shape identifiers to an integer texture as a color attachment to a frame buffer of a rendering pipeline of the GPU 114 or a remote GPU 114 and the blending module 110 issues render calls for the objects 120-124 on the frame buffer.

To do so in one example, a vertex shader of the rendering pipeline receives the unique shape identifiers, and the vertex shader reads the unique shape identifiers to compute coverage for corresponding ones of the objects 120-124 and the combinations of the objects 120-124. For example, pixels of the objects 120-124 are partially rendered at edges to produce an anti-aliased appearance and a corresponding unique shape identifier is associated with the partially rendered pixels. If coverage of any pixel is zero, then the corresponding fragment is discarded. Otherwise, the vertex shader passes the unique shape identifiers and corresponding coverage to a fragment shader of the rendering pipeline which generates shape masks.

In an example, the vertex shader receives bounding box coordinates for the objects 120-124 and passes these coordinates to the fragment shader. For example, the bounding box is a union bounding box of the objects 120-124 that contains all pixels that could be painted by at least one of the objects 120-124. The fragment shader then samples the shape masks to compute final colors for the objects 120-124 which is described in greater detail with respect to FIG. 6 below.

The blending module 110 receives the computed final colors from the fragment shader and uses the final colors along with shapes and textures to generate an example 126 which is rendered in a user interface 128 of the display device 106. For instance, the example 126 includes the objects 120-124 as well as blend objects 130-136. As shown, blend object 130 is a combination of the objects 120, 122; blend object 132 is a combination of the objects 120, 124; blend object 134 is a combination of the objects 122, 124; and blend object 136 is a combination of the objects 120, 122, 124. By assigning the unique shape identifiers to the objects 120-124 and their combinations 130-136 and generating the shape masks based on the unique shape identifiers in this manner, it is possible for the blending module 110 to efficiently generate and render the blend objects 130-136 even when synchronization primitives are not available.

Figure 2:
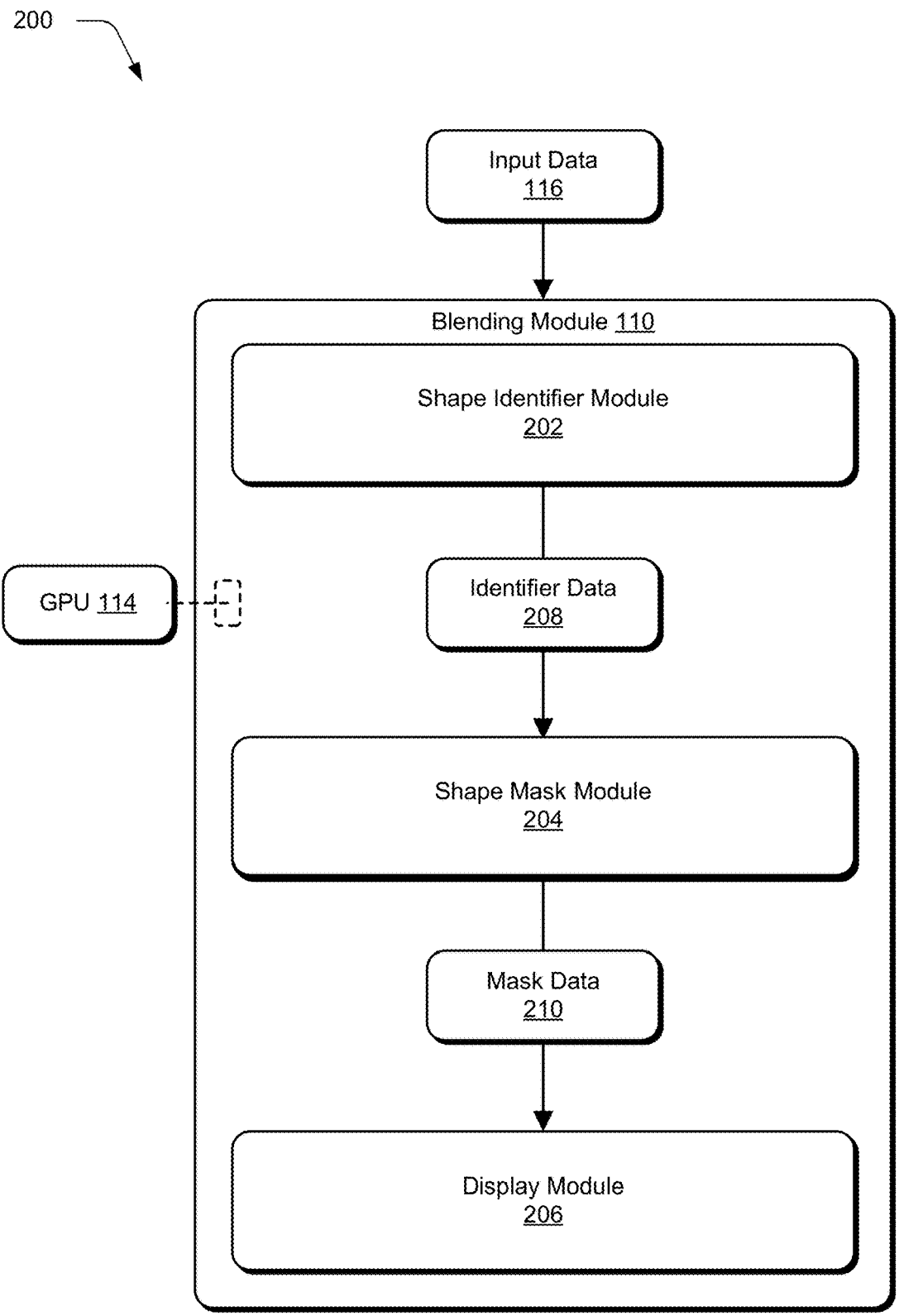
FIG. 2 depicts a system in an example implementation showing operation of a blending module for efficiently generating blend objects.

FIG. 2 depicts a system 200 in an example implementation showing operation of a blending module 110. The blending module 110 is illustrated to include a shape identifier module 202, a shape mask module 204, and a display module 206. For example, the blending module 110 also illustrated to have access to the GPU 114 which is available locally to the computing device 102 in some examples and which is available via the network 104 in other examples. For instance, the shape identifier module 202 receives and processes the input data 116 to generate identifier data 208.

Figure 3:
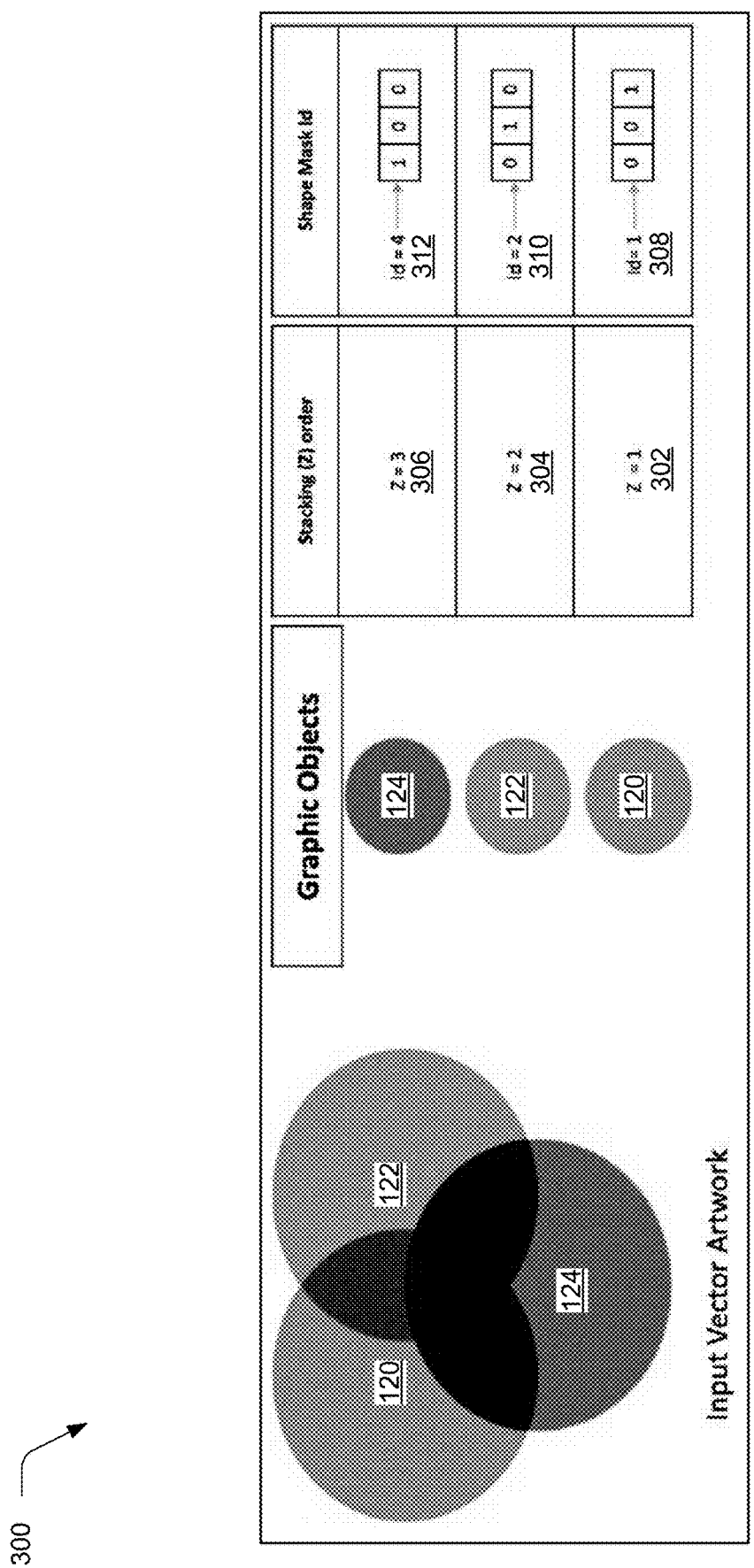
FIG. 3 illustrates a representation of assigning unique shape identifiers to objects included in an input render tree.

FIG. 3 illustrates a representation 300 of assigning unique shape identifiers to objects included in an input render tree. For example, the shape identifier module 202 receives the input data 116 describing the objects 120-124 included in the input render tree 118. In this example, the shape identifier module 202 processes the input data 116 to identify a z-order position 302 for the object 120; a z-order position 304 for the object; and a z-order position 306 for the object 124. The shape identifier module 202 assigns a unique shape identifier 308 of 0 0 1 to the object 120; a unique shape identifier 310 of 0 1 0 to the object 122; and a unique shape identifier 312 of 1 0 0 to the object 124. In one example, the shape identifier module 202 generates the identifier data 208 as describing the unique shape identifiers 308, 310, 312 and the corresponding objects 120, 122, 124.

Figure 4:
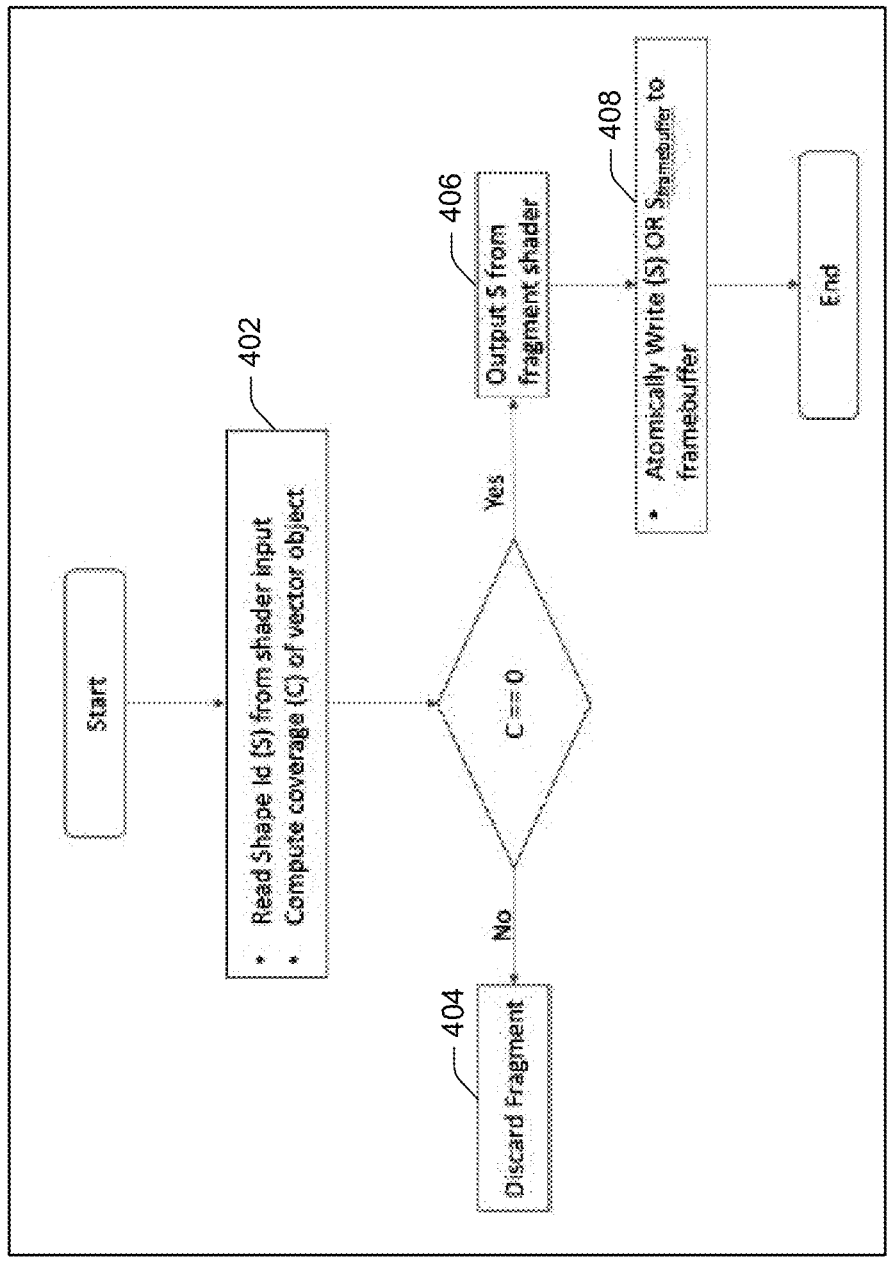
FIG. 4 illustrates a representation of writing unique shape identifiers to an integer texture of a frame buffer in a graphics processing unit pipeline.

For instance, the shape mask module 204 receives and processes the identifier data 208 to generate mask data 210. FIG. 4 illustrates a representation 400 of writing unique shape identifiers to an integer texture of a frame buffer in a graphics processing unit pipeline. At 402, the shape mask module 204 processes the identifier data 208 to include the unique shape identifiers 308, 310, 312 in an integer texture as a color attachment to a buffer (e.g., a vertex buffer, a frame buffer, etc.) instead of writing color values to a floating point frame buffer.

In one example, a vertex shader of a graphics processing pipeline of the GPU 114 receives the buffer and the unique shape identifiers 308, 310, 312. The vertex shader issues render calls for each of the objects 120, 122, 124 on the buffer and each of the objects 120, 122, 124 is drawn in the z-order of the input render tree 118. Next, the objects 120, 122, 124 are partially rendered at edges to produce an anti-aliased appearance. For example, the vertex shader associates one of the unique shape identifiers 308, 310, 312 with the partially rendered pixels and also computes coverage for the pixels. In this example, the vertex shader passes the unique shape identifiers 308, 310, 312 and the computed coverage to a fragment shader of the graphics processing pipeline of the GPU 114.

The fragment shader receives the unique shape identifiers 308, 310, 312 and the computed coverage, and the fragment shader discards any fragments having zero coverage. At 404, these fragments are discarded. At 406, non-discarded fragments are appended via a write operation (e.g., an OR operation) to a current value in a shape texture. At 408, non-discarded fragments and corresponding ones of the unique shape identifiers 308, 310, 312 are written to a frame buffer. For example, after drawing each object in the integer texture, the color attachment is reset to a floating point texture to store color values. The fragment shader then uses information included in the frame buffer to generate shape masks.

Figure 5B:
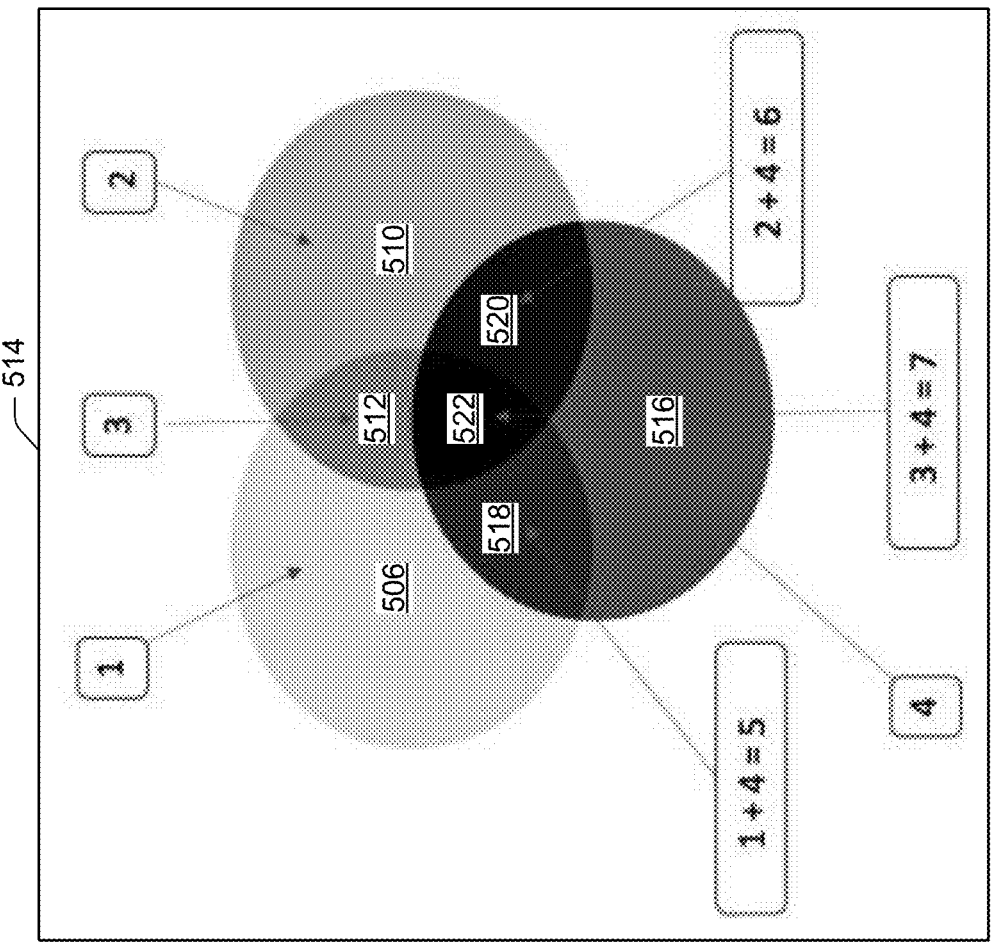

FIGS. 5A and 5B illustrate a representation of generating shape masks based on unique shape identifiers of objects included in an input render tree. FIG. 5A illustrates a representation 500 of first and second examples of shape mask textures after rendering one object and two objects, respectively. FIG. 5B illustrates a representation 500 of a third example of shape mask textures after rendering three objects.

With reference to FIG. 2 and FIG. 5A, the shape mask module 204 processes the identifier data 208 to generate a first example 504 which includes a first object 506 having a unique shape identifier of 1. For instance, the first example 504 includes a first shape mask which is associated with the unique shape identifier of 1. The shape mask module 204 also processes the identifier data 208 to generate a second example 508 which includes the first object 506 with the unique shape identifier of 1 and a second object 510 having a unique shape identifier of 2. The second example 508 also includes a combination 512 of the first object 506 and the second object 510. In an example, the combination 512 has a unique shape identifier of 3=1+2. The second example 508 includes the first shape mask and a second shape mask that is associated with the unique identifier of 2. The second example 508 also includes a third shape mask that is associated with the unique shape identifier of 3.

As shown in FIG. 5B, the representation 502 includes a third example 514 which includes the first object 506 having the unique shape identifier of 1; the second object 510 having the unique shape identifier of 2; and the combination 512 having the unique shape identifier of 3=1+2. For instance, the third example 514 also includes a third object 516 having a unique shape identifier of 4; a combination 518 of the first object 506 and the third object 516 having a unique shape identifier of 5=1+4; a combination 520 of the second object 510 and the third object 516 having a unique shape identifier of 6=2+4; and a combination 522 of the first object 506, the second object 510, and the third object 516 having a unique shape identifier of 7=3+4. Accordingly, the third example 514 includes the first shape mask, the second shape mask, the third shape mask, a fourth shape mask that is associated with the unique shape identifier of 4, a fifth shape mask that is associated with the unique shape identifier of 5, a sixth shape mask that is associated with the unique shape identifier of 6, and a seventh shape mask that is associated with the unique shape identifier of 7.

For example, by associating the shape masks with the unique shape identifiers in this manner, the shape mask module 204 facilitates batching of blend objects such that multiple blend objects are capable of being rendered in a single draw call. This is because the unique shape identifiers are numbers corresponding objects that contribute to colors of blend objects rather than the colors themselves. In one example, the shape mask module 204 generates the mask data 210 as describing the seven shape masks included in the third example 514. The display module 206 receives and processes that mask data 210 to render blend objects.

Figure 6:
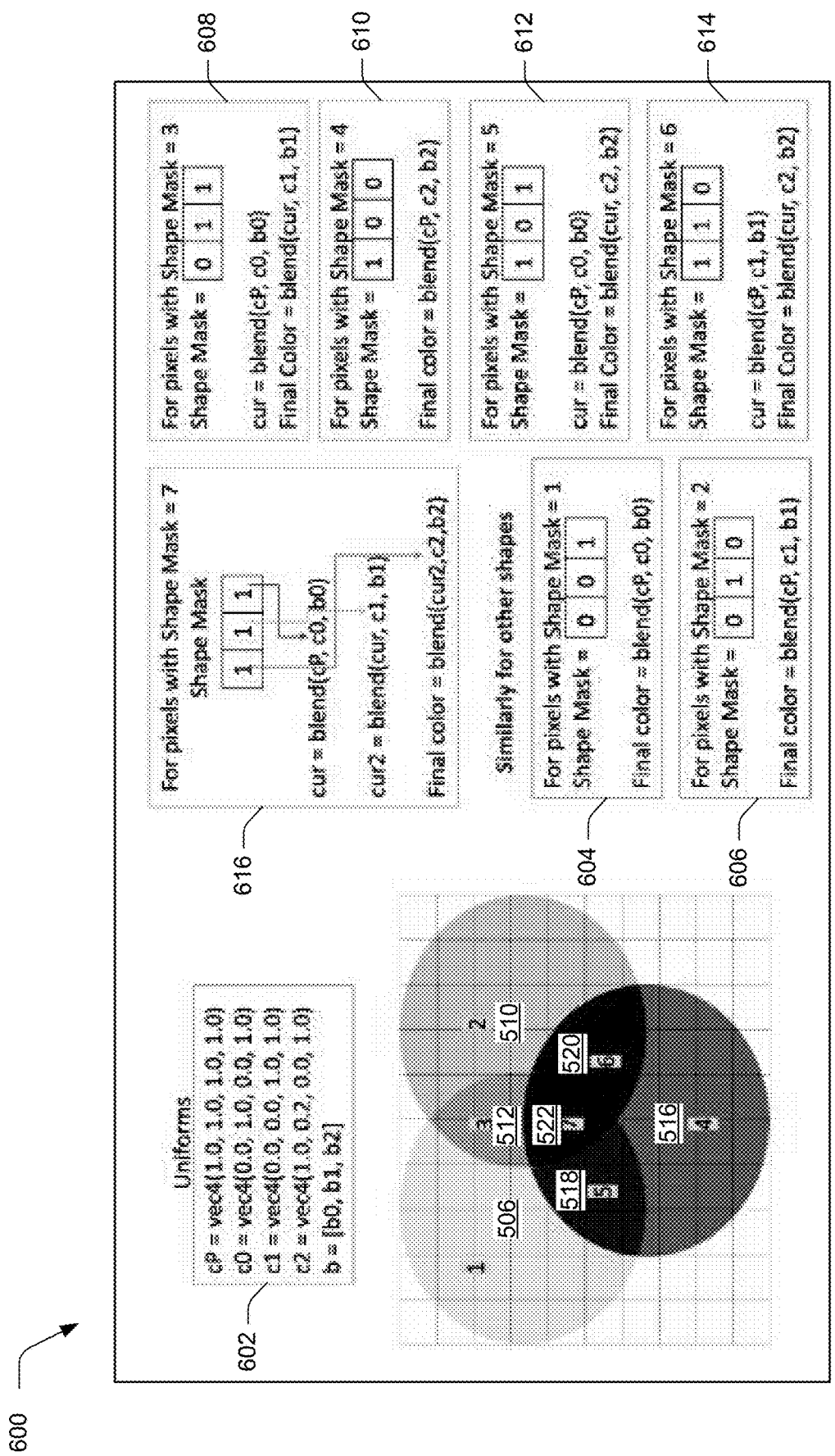
FIG. 6 illustrates a representation of computing colors of pixels of a blend object based on objects that contribute to the blend object using shape masks.

FIG. 6 illustrates a representation 600 of computing colors of pixels of a blend object based on objects that contribute to the blend object using shape masks. As shown, the representation 600 includes the third example 514. For example, the display module 206 processes the mask data 210 to determine colors of pixels of a blend object using the seven shape masks included in the third example 514. In an example, the display module 206 computes a color for every fragment in parallel during a fragment shader stage of the graphics processing pipeline of the GPU 114. In this example, the display module 206 iterates over bits in the shape masks included in the third example 514 for each fragment such that if a bit is set to 1, then a corresponding object is considered for color computation. Since lower order bits represent objects lower in the z-order of the input render tree 118, the display module 206 computes colors by compositing colors of each ith object with a color computed until a (i−1)th using a blend mode of the ith object. In an example, this is representable as:

```
procedure GET FRAGMENT COLOR(C,B)
    prevcolor ← Color form Previous Render Texture
    S ← Shape Mask from Shape Texture
    i ← 0
    for each bit (b) in (S) do
        if b is set then
            currcolor = C[i]
            blend = B[i]
            newcolor = BlendColors(currcolor,prevcolor,blend)
            prevcolor ← newcolor
            i ← i + 1
        else
            continue
``` where: C represents an input array of colors; and B represents an array of blend modes. Note, for example, that the above algorithm does not explicitly state that a transparency (alpha) is an input to a shader considering that the colors C are multiplied with alpha. In this example, the technique is equally valid and applicable where rendering engines maintain non-multiplied colors C.

In the representation 600, C and B are illustrated as uniforms 602 which includes an input array of colors and an array of blend modes for C and B, respectively. For example, the display module 206 computes a first final color 604 for pixels having the first shape mask with the unique shape identifier of 1 or 0 0 1 by blending cP, c0, and b0. In this example, the first final color 604 is directly computable because the first shape mask corresponds to the object 506.

Continuing the previous example, the display module 206 computes a second final color 606 for pixels having the second shape mask with the unique shape identifier of 2 or 0 1 0 by blending cP, c1, and b1. The second final color 606 is also directly computable because the second shape mask corresponds to the object 510. In another example, the display module 206 computes a third final color 608 for pixels having the third shape mask with the unique shape identifier of 3 or 0 1 1. In this example, however, the third final color 608 is not directly computable because the third shape mask corresponds to the combination 512 which includes a combination of the objects 506, 510. For instance, the display module 206 computes a current color cur by blending cP, c0, and b0. The display module 206 then computes the third final color 608 by blending cur, c1, and b1.

The display module 206 computes a fourth final color 610 for pixels having the fourth shape mask with the unique shape identifier of 4 or 1 0 0 by blending cP, c2, and b2.

Similar to the first final color 604 and the second final color 606, the fourth final color 610 is directly computable because the fourth shape mask corresponds to the object 516. For example, the display module 206 computes a fifth final color 612 for pixels having the fifth shape mask with the unique shape identifier of 5 or 1 0 1. Because the fifth shape mask corresponds to the combination 518, the display module 206 computes cur by blending cP, c0, and b0. The display module 206 then computes the fifth final color 612 by blending cur, c2, and b2.

In one example, the display module 206 computes a sixth final color 614 for pixels having the sixth shape mask with the unique shape identifier of 6 or 1 1 0. Since the sixth final color 614 is not directly computable (e.g., the sixth shape mask corresponds to the combination 520), the display module 206 computes cur by blending cP, c1, and b1. For instance, the display module 206 then computes the sixth final color 614 by blending cur, c2, and b2.

In a final example, the display module 206 computes a seventh final color 616 for pixels having the seventh shape mask with the unique shape identifier of 7 or 1 1 1. The seventh shape mask corresponds to the combination 522 that includes the objects 506, 510, 516. Accordingly, in one example, the display module 206 computes cur by blending cP, c0, and b0. Next, the display module 206 computes cur2 by blending cur, c1, and b1. For example, the display module 206 computes the seventh final color 616 by blending cur2, c2, and b2.

Figure 7A:
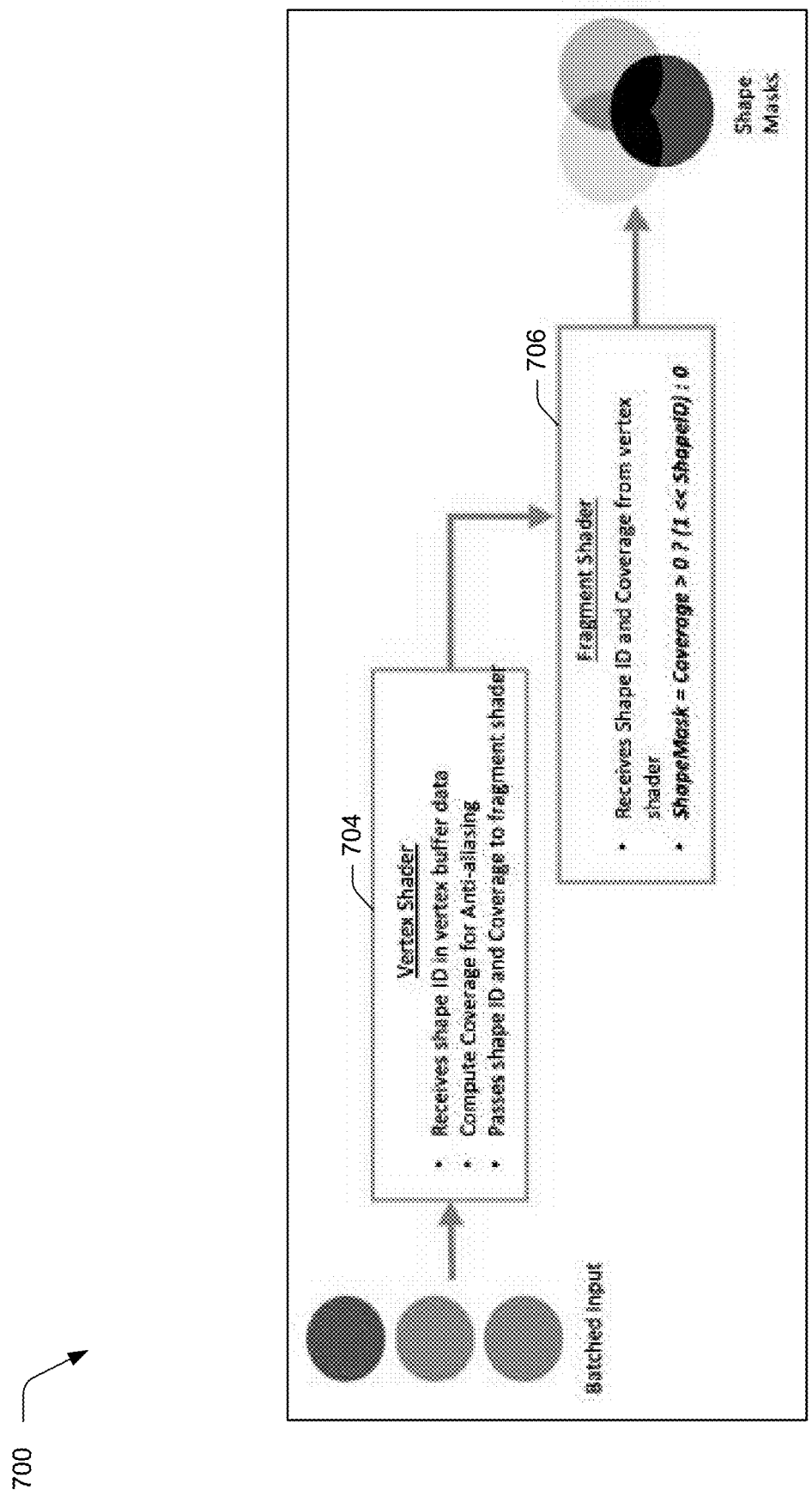
FIGS. 7A and 7B illustrate a representation of using shape masks for efficiently generating blend objects.
Figure 7B:
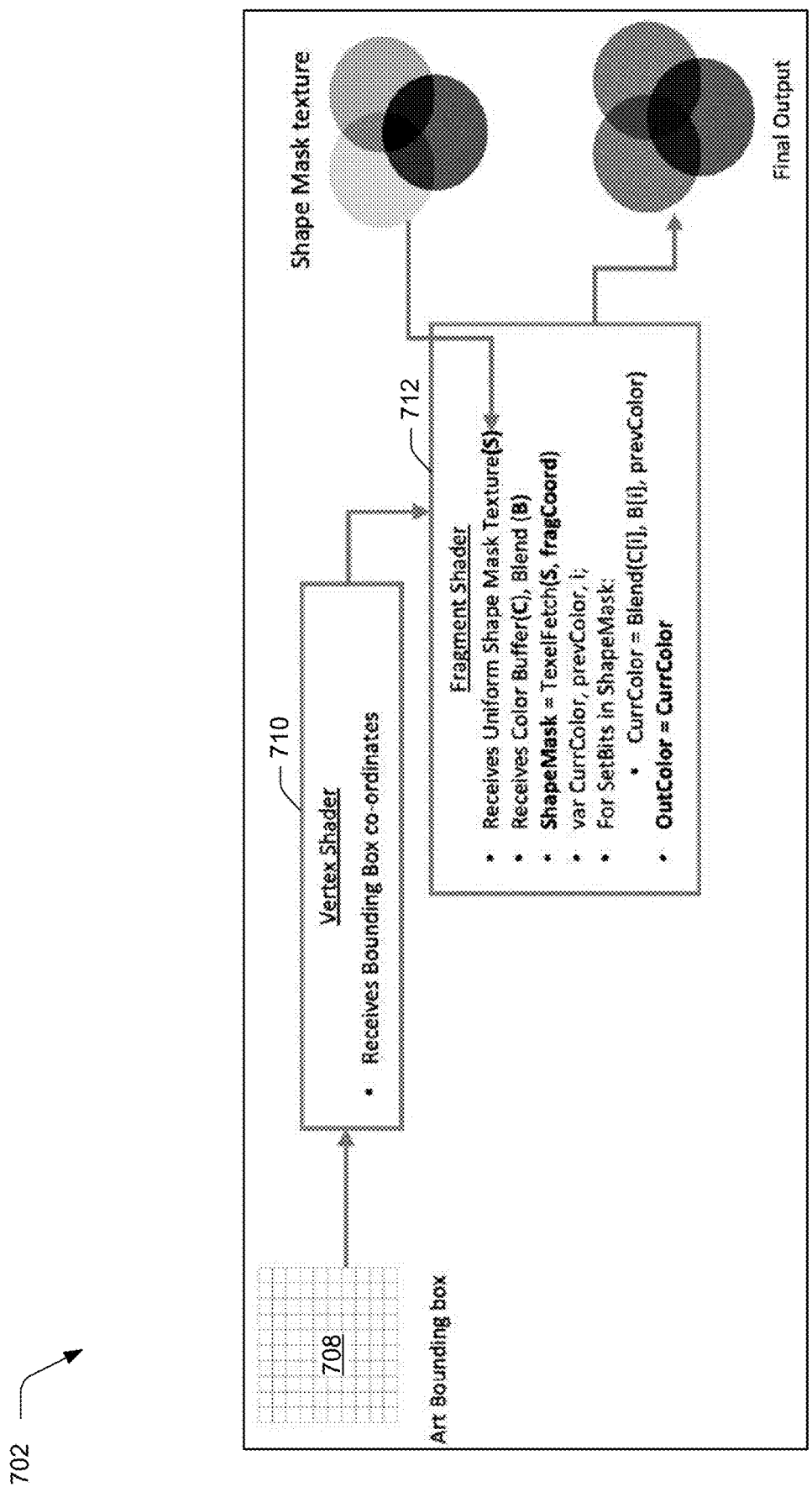

FIGS. 7A and 7B illustrate a representation of using shape masks for efficiently generating blend objects. FIG. 7A illustrates a representation 700 of shape masks generated from batched inputs by a vertex shader and a fragment shader of the graphics processing pipeline of the GPU 114. FIG. 7B illustrates a representation 702 of final colors computed by the vertex shader and the fragment shader of the graphics processing pipeline of the GPU 114 from input bounding boxes of objects using the shape masks. For example, the blending module 110 implements the display module 206 to draw the input render tree 118. In one example, this is representable as:

```
procedure DRAW RENDER TREE(T,N,FBO)
    while(art in T) do
        ColorArray ← Array having color of each object
        BlendArray ← Array storing blend modes across objects
        ArtArray ← Array storing art objects
        Count ← 0
        while Count < k do
            ArtArray ← ArtArray + art
            ColorArray ← ColorArray + art.color
            BlendArray ← BlendArray + Blend applied between art and previous art
            Count ← Count + 1
        Attach S to FBO
        Draw ArtArray to FBO to generate Shape Masks
        Compute Bounding Box BB of Arts in ArtArray
        Attach C back to FBO
        Send S as uniform to Fragment Shader
        for each pixel in BB do
            GetFragColor(ColorArray,BlendArray)
        Reset S
``` where: T represents the input render tree 118; N is a number of objects in Artwork Tree N; and S represents shapes, C represents colors, and FBO represents textures of a Framebuffer.

With reference to FIG. 7A, at 704 the vertex shader receives a batched input including unique shape identifiers in vertex buffer data. The vertex shader computes coverage and partially renders edge pixels for anti-aliasing. At 706, the fragment shader receives the unique shape identifiers and computed coverage, and the fragment shader generates the shape masks. With reference to FIG. 7B, the representation 702 includes a bounding box 708 which is a union bounding box of k objects and k is a set of objects that is representable with unique shape identifiers. For example, the bounding box 708 includes a set of all pixels that could be painted by objects of the k objects and color to be painted at any particular pixel is determined by color, transparency, and blend modes of objects over the particular pixel in a fragment shader stage of the graphics processing pipeline of the GPU 114. At 710, the vertex shader receives coordinates of the bounding box 708 which are passed to the fragment shader. At 712, the fragment shader uses the coordinates and the shape masks to compute final colors. Once the final colors are computed, the display module 206 uses the final colors to render blend objects in the user interface 128 of the display device 106. For example, it is possible for the display module 206 to efficiently generate and render the blend objects even when synchronization primitives are not available.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7. FIG. 8 is a flow diagram depicting a procedure 800 in an example implementation in which a color of a pixel of a blend object is computed and the blend object is generated for display in a user interface based on the color of the pixel.

Unique shape identifiers are assigned to objects included in an input render tree (block 802). In an example, the computing device 102 implements the blending module 110 to assign the unique shape identifiers to the objects included in the input render tree. A shape mask is generated based on the unique shape identifiers (block 804). For example, the blending module 110 generates the shape mask.

A color of a pixel of a blend object is computed based on particular objects that contribute to the blend object using the shape mask (block 806). In one example, the computing device 102 implements the blending module 110 to compute the color of the pixel. The blend object is generated for display in a user interface based on the color of the pixel (block 808). In some examples, the blending module 110 generates the blend object.

Figure 9A:
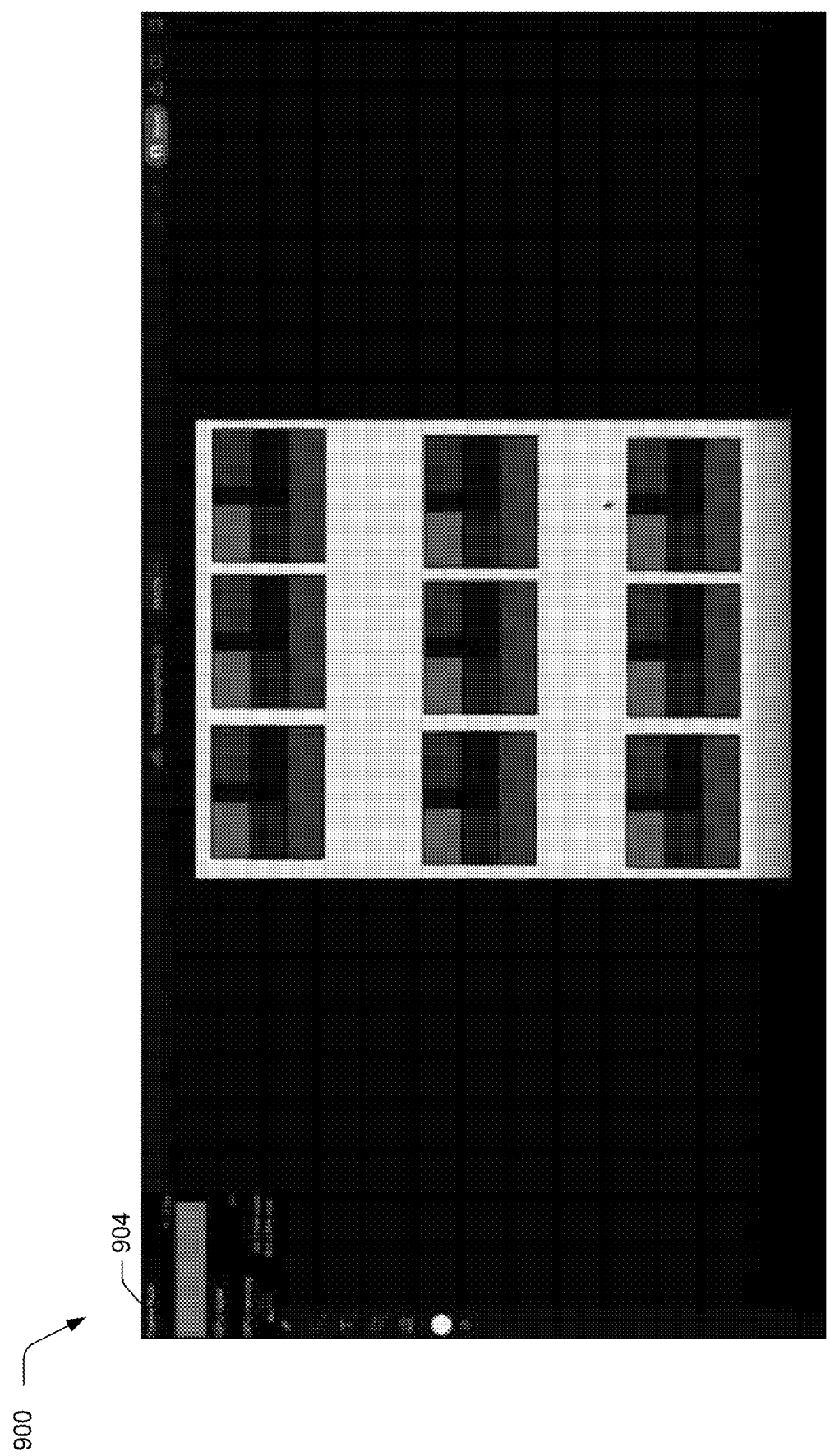
FIGS. 9A and 9B illustrate an improvement example of systems and techniques for efficiently generating blend objects as described herein.
Figure 9B:
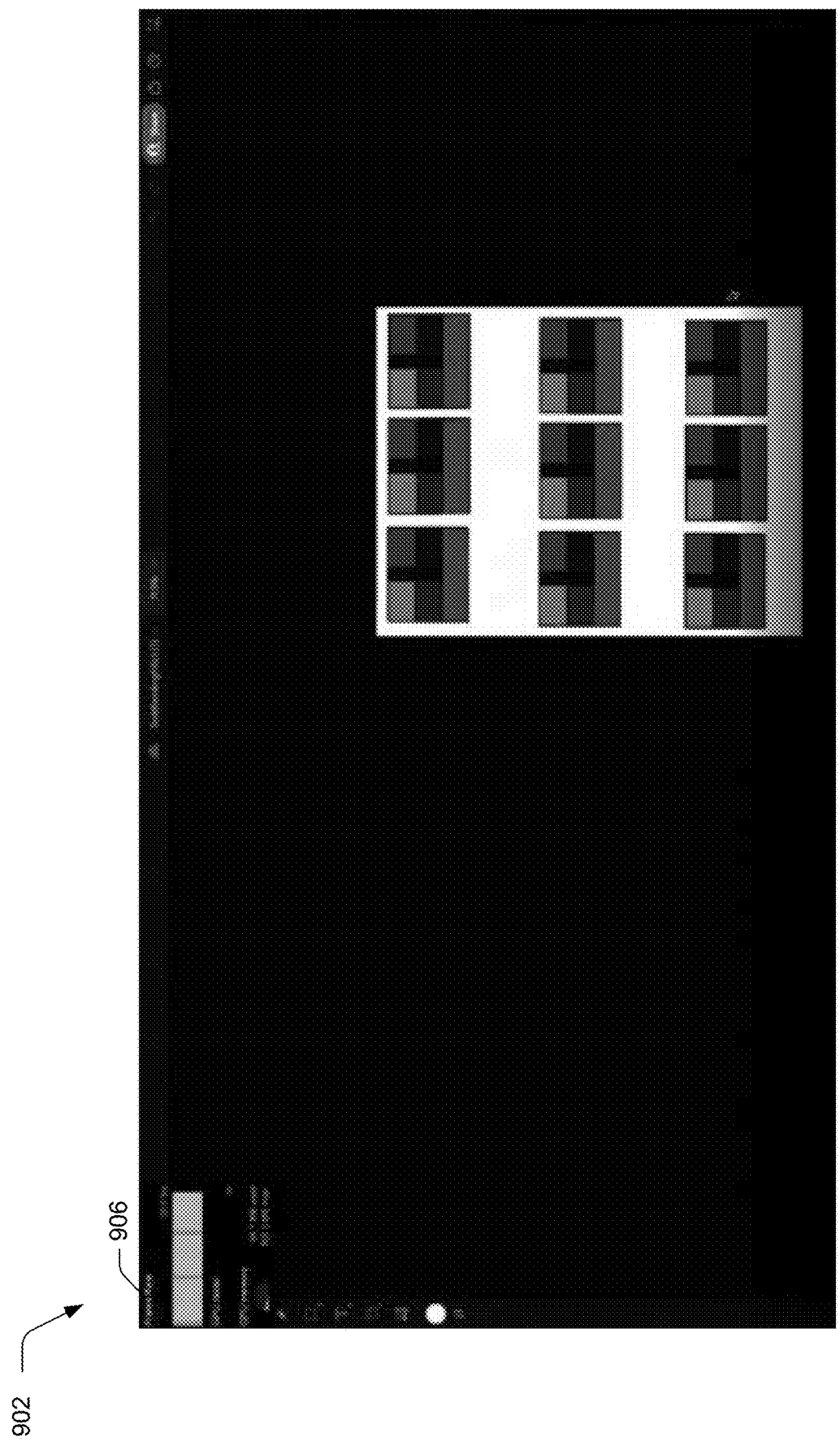

FIGS. 9A and 9B illustrate an improvement example of systems and techniques for efficiently generating blend objects as described herein. FIG. 9A illustrates a representation 900 of digital artwork having blend objects displayed in a user interface without using the described systems for efficiently generating blend objects. FIG. 9B illustrates a representation 902 of the digital artwork having blend objects displayed in the user interface using the described systems for efficiently generating blend objects.

As shown in the representation 900, a user interacts with an input device (e.g., a mouse, a stylus, a touchscreen, etc.) to manipulate the digital artwork having blend objects which is displayed at a first framerate 904. In the representation 902, the user interacts with the input device to manipulate the digital artwork having blend objects which is displayed at a second framerate 906. For instance, the first framerate 904 is approximately 43.2 fps while the second framerate 906 is approximately 58.8 fps. Accordingly, the second framerate 906 is about 36.1 percent greater than the first framerate 904 because of the improvements in rendering efficiency for blend objects made possible by the described systems and techniques for efficiently generating blend objects.

Example System and Device

Figure 10:
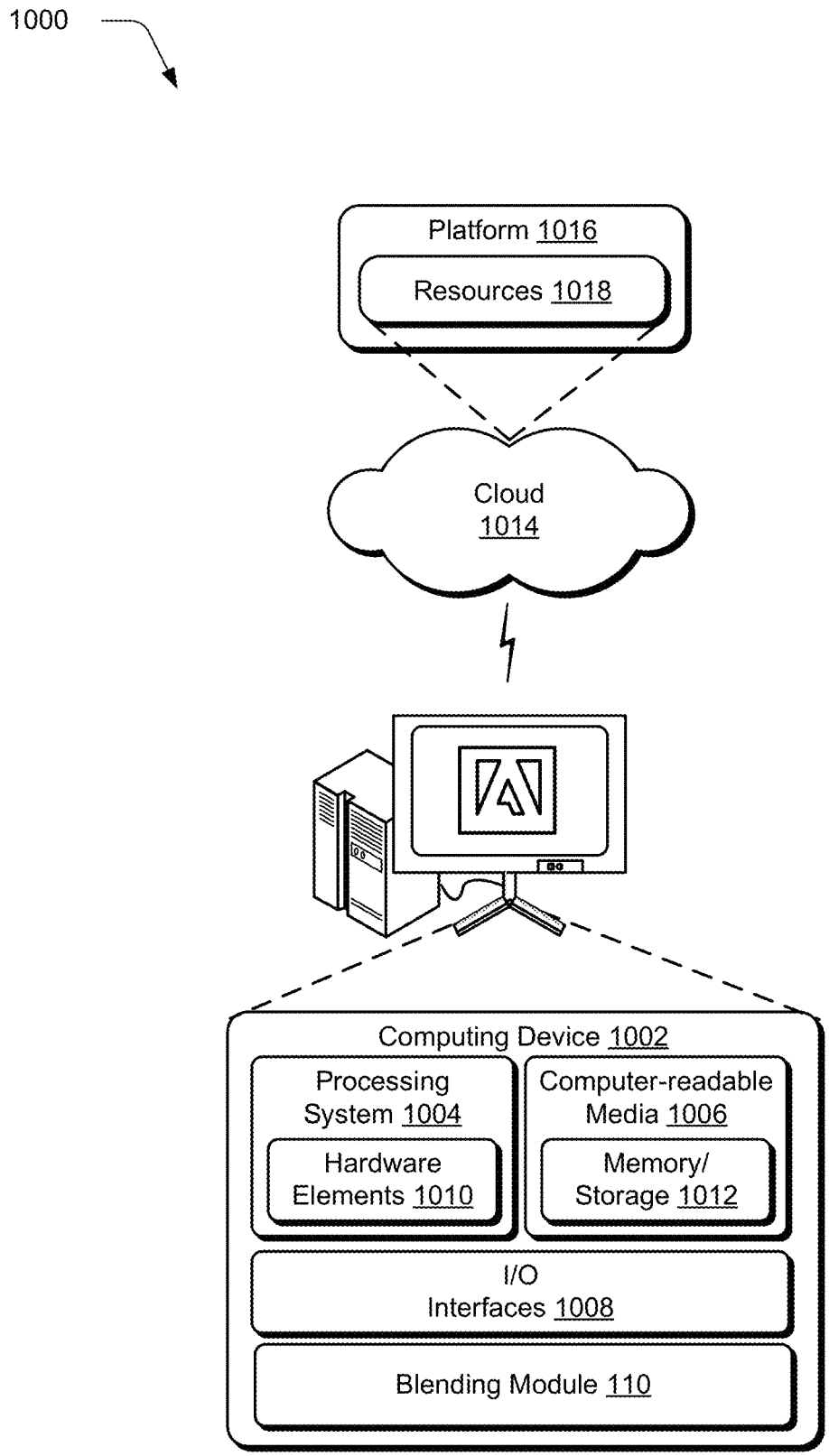
FIG. 10 illustrates an example system that includes an example computing device that is representative of one or more computing systems and/or devices for implementing the various techniques described herein.

FIG. 10 illustrates an example system 1000 that includes an example computing device that is representative of one or more computing systems and/or devices that are usable to implement the various techniques described herein. This is illustrated through inclusion of the blending module 110. The computing device 1002 includes, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that are configured as processors, functional blocks, and so forth. This includes example implementations in hardware as an application specific integrated circuit or other logic device formed using one or more semiconductors. The hardware elements 1010 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1006 is illustrated as including memory/storage 1012. The memory/storage 1012 represents memory/storage capacity associated with one or more computer-readable media. In one example, the memory/storage 1012 includes volatile media (such as random access memory (RAM)) and/or nonvolatile media (such as read only memory (ROM), Flash memory, optical disks, magnetic disks, and so forth). In another example, the memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1010. For example, the computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supportable by various configurations of the computing device 1002 and are not limited to the specific examples of the techniques described herein. This functionality is also implementable entirely or partially through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. For example, the resources 1018 include applications and/or data that are utilized while computer processing is executed on servers that are remote from the computing device 1002. In some examples, the resources 1018 also include services provided over the Internet and/or through a subscriber network, such as a cellular or Wi-Fi network.

The platform 1016 abstracts the resources 1018 and functions to connect the computing device 1002 with other computing devices. In some examples, the platform 1016 also serves to abstract scaling of resources to provide a corresponding level of scale to encountered demand for the resources that are implemented via the platform. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although implementations of systems for efficiently generating blend objects have been described in language specific to structural features and/or methods, it is to be understood that the appended claims are not necessarily limited to the specific features or methods described. Rather, the specific features and methods are disclosed as example implementations of systems for generating blend objects, and other equivalent features and methods are intended to be within the scope of the appended claims. Further, various different examples are described and it is to be appreciated that each described example is implementable independently or in connection with one or more other described examples.

What is claimed is:
1. A method comprising:
assigning, by a processing device, unique shape identifiers to objects included in an input render tree based on a z-order of the objects, each of the unique shape identifiers having a number of bits equal to a number of the objects included in the input render tree;
generating, by the processing device, a shape mask based on the unique shape identifiers, the shape mask including bit positions that correspond to the z-order of the objects and bit values that correspond to color contributions of the objects;
computing, by the processing device, a color of a pixel of a blend object by identifying particular objects of the objects that contribute to the blend object based on the bit positions and the bit values of the shape mask; and
generating, by the processing device, the blend object for display in a user interface based on the color of the pixel.

2. The method as described in claim 1, wherein the particular objects are before the blend object in the input render tree.

3. The method as described in claim 1, wherein the shape mask is generated based on the z-order of the objects included in the input render tree.

4. The method as described in claim 1, further comprising including the unique shape identifiers in vertex buffer data received by a vertex shader of a graphics processing unit pipeline.

5. The method as described in claim 1, further comprising writing the unique shape identifiers to an integer texture of a frame buffer.

6. The method as described in claim 1, wherein the shape mask is generated by combining the unique shape identifiers.

7. The method as described in claim 1, wherein computing the color of the pixel includes performing a blend operation for a first object and a second object of the particular objects.

8. The method as described in claim 1, further comprising computing a union bounding box of the objects that includes the color of the pixel.

9. The method as described in claim 1, wherein an object included in the particular objects is an additional blend object.

10. A system comprising:
a memory component; and a processing device coupled to the memory component, the processing device to perform operations including:

assigning unique shape identifiers to objects included in an input render tree based on a z-order of the objects, each of the unique shape identifiers having a number of bits equal to a number of the objects included in the input render tree;

generating a shape mask based on the unique shape identifiers, the shape mask including bit positions that correspond to the z-order of the objects and bit values that correspond to color contribution of the objects;

computing a color of a pixel of a blend object by identifying particular objects of the objects that contribute to the blend object based on the bit positions and the bit values of the shape mask; and generating the blend object for display in a user interface based on the color of the pixel.

11. The system as described in claim 10, wherein an object included in the particular objects is an additional blend object.

12. The system as described in claim 10, wherein the shape mask is generated based on the z-order of the objects included in the input render tree.

13. The system as described in claim 10, wherein computing the color of the pixel includes performing a blend operation for a first object and a second object of the particular objects.

14. The system as described in claim 10, the operations further including writing the unique shape identifiers to an integer texture of a frame buffer.

15. A non-transitory computer-readable storage medium storing executable instructions, which when executed by a processing device, causes the processing device to perform operations comprising:

assigning unique shape identifiers to objects included in an input render tree;

generating a shape mask based on the unique shape identifiers, the shape mask including bit positions that correspond to a z-order of the objects and bit values that correspond to color contributions of the objects;

computing a color of a pixel of a blend object by identifying a relative order of the objects in the input render tree defined by the bit positions in the shape mask, and particular objects of the objects that contribute to the blend object based on the bit values in the shape mask; and generating the blend object for display in a user interface based on the color of the pixel.

16. The non-transitory computer-readable storage medium as described in claim 15, wherein a number of bits included in the unique shape identifiers is equal to a number of the objects included in the input render tree.

17. The non-transitory computer-readable storage medium as described in claim 15, wherein an object included in the particular objects is an additional blend object.

18. The non-transitory computer-readable storage medium as described in claim 15, wherein the operations further comprise computing a union bounding box of the objects that includes the color of the pixel.

19. The non-transitory computer-readable storage medium as described in claim 15, further comprising displaying the blend object.

20. The non-transitory computer-readable storage medium as described in claim 15, further comprising assigning an additional unique shape identifier to a combination of two or more of the objects, the additional unique shape identifier having a value between values of the unique shape identifiers assigned to the two or more objects.

* * * * *